July 24, 1934.  B. DICK  1,967,664
LIQUID PRESSURE MECHANISM
Filed Nov. 16, 1933
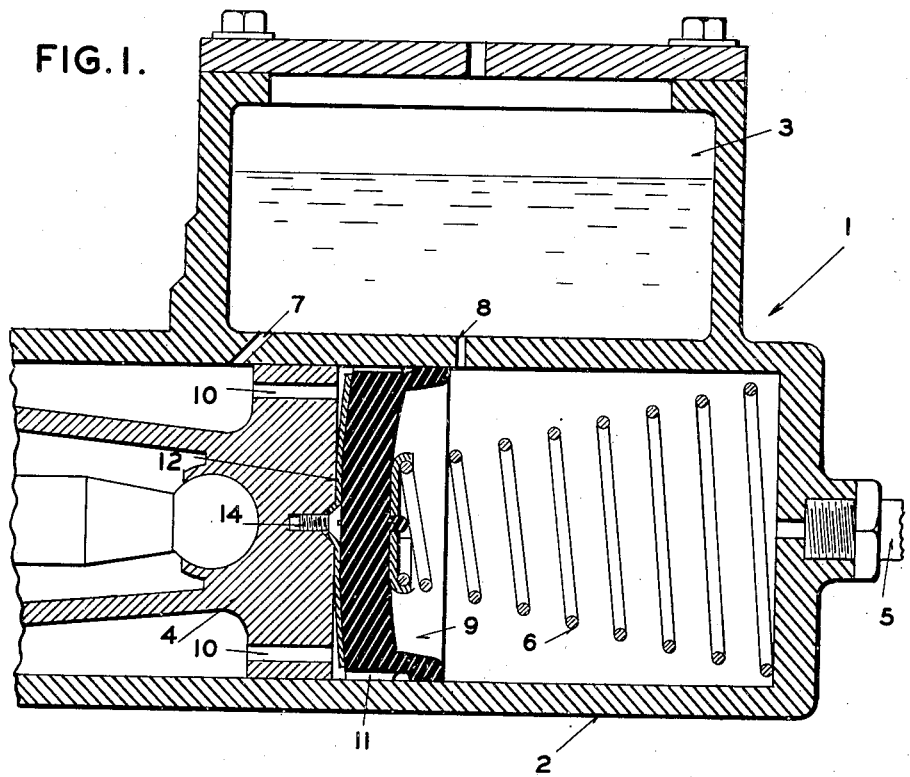
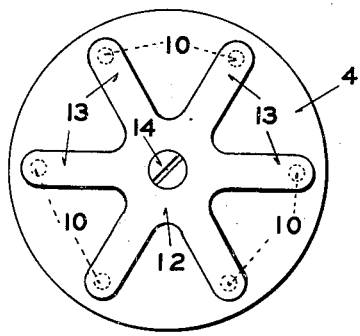
Inventor
BURNS DICK
By
Att'y.

Patented July 24, 1934

1,967,664

UNITED STATES PATENT OFFICE 1,967,664

LIQUID PRESSURE MECHANISM

Burns Dick, Ferguson, Mo., assignor to Wagner Electric Corporation, St. Louis, Mo., a corporation of Delaware Application November 16, 1933, Serial No. 698,360

8 Claims. (Cl. 60—54.6)

My invention relates to liquid pressure mechanism and more particularly to improvements in compensating compressors for hydraulic braking systems.

In compensating compressors for hydraulic brake systems as now constructed, the compressor piston is provided with a series of holes or openings extending therethrough whereby fluid may flow from the fluid containing chamber at the rear of the piston to the cylinder ahead of the piston during the return stroke of the piston. The packing cup associated with the piston is so constructed that flow of fluid past the cup is permitted during the return stroke of the piston but prevented during the forward pressure stroke. Since packing cups are generally constructed of a flexible material, as for example, rubber, this material is forced into the holes in the piston by the high fluid pressure developed during the forward stroke of the piston, thereby causing the packing cup to be cut and the flow of fluid through the holes hindered during the return stroke of the piston.

One of the objects of my invention is the provision of means between a piston having a passage therethrough and a cooperating packing cup for preventing the material of the packing cup from being forced into the passage in the piston on the pressure stroke of the piston, thereby eliminating the cutting of the packing cup and extending the usual life of the packing cup.

A more specific object of my invention is to provide the head of a piston having a series of openings therethrough, with a dished resilient member having portions thereof overlying the openings in the piston head but normally out of contact with the piston head surface adjacent the openings, whereby the flexible material of the packing cup, which cooperates with the piston head, will not be forced into the openings when a pressure is created between the piston and the packing cup, and whereby the openings in the piston will be uncovered when the pressure between the piston head and the packing cup is relieved.

Other objects of my invention will become apparent from the following specification taken in connection with the accompanying drawing, showing one embodiment thereof, in which Figure 1 is a cross sectional view of a portion of a compressor for a hydraulic brake system showing my invention embodied therein; and Figure 2 is an end view of the piston with the packing cup removed.

Referring in detail to the drawing, the numeral 1 indicates a compressor or master cylinder of the compensating type which is provided with a cylinder 2, a reservoir 3, and a piston 4. The cylinder 2 is in communication with the brake actuating fluid motors by means of the conduit 5. The piston 4 is normally biased to its retracted position against a stop (not shown) by means of the spring 6. The reservoir is in communication with the cylinder by means of a pair of passages 7 and 8, the passage 7 communicating with the cylinder at the rear of the piston and the passage 8 communicating with the cylinder ahead of the piston when the piston is in retracted position. The rear of the piston is provided with suitable packing (not shown) to prevent leakage of fluid from the compressor.

The piston head has associated with it a packing cup 9 of rubber or other flexible material, to prevent the leakage of fluid past the piston when the piston is operated to force fluid into the brake actuating motors. The piston is provided with a plurality of equally spaced passages 10 adjacent its periphery, and the wall of the cup is provided with grooves 11, the purpose of which is to permit fluid to readily flow from the chamber at the rear of the piston to the cylinder space ahead of the packing cup during the return stroke of the piston (the lip of the cup flexing inwardly to permit this flow) in order to prevent the formation of a vacuum in the system and the drawing in of air at the brake actuating motors.

In the structure just described, which is the conventional type of compressor, the packing cup is always tightly compressed against the head of the piston by the fluid pressure when the piston is actuated. The high fluid pressure developed by the compressor during braking operation, forces the material of the packing cup into the piston passage 10 and, as a result, the cup is cut. In some cases the walls of the piston passage have been known to cut a hole completely through the packing cup. This cutting of the material of the packing cup not only decreases the life of the cup but hinders the flow of fluid through the passages during the return stroke of the piston since the cut-out portions of the rubber tends to fill up the passages.

In accordance with my invention I interpose a simple device between the piston head and the packing cup for eliminating the undesirable features of the piston and packing cup construction just described. The device consists essentially of a piece of very thin metal 12 having a plurality of radially extending fingers 13, the number of fingers corresponding to the number of passages 10 and each adapted to bridge and cover the open end of a passage. The metal is about .010 to .015 inches thick and is formed of material having a slight resiliency, as for example, aluminum or phosphor bronze. The member 12, including the fingers, is initially formed with a slight dish so that when it is secured to the piston head by suitable means, such as a screw 14, the portion of the fingers adjacent the passages will normally be spaced about .010 to .015 inches from the piston surface as shown in Figure 1. Thus, when the packing cup is not being pressed down on the piston head, as for example, during the retractile movement of the piston, the fingers will not cover the open ends of the passages and prevent free flow of fluid therethrough. However, when the piston is actuated to compress fluid in the cylinder, the cup will press the fingers down over the open ends of the passages and prevent the material of the cup from being cut by being forced into the passages. Due to the thinness of the member 12, it alone will not cut the cup when the cup is under pressure, as the rubber of the cup is sufficiently flexible to permit the member to be imbedded therein.

The thin metal member 12 is very cheaply made and installed. Neither the piston nor the packing cup, as now constructed, need be redesigned to accommodate the member. The only necessary change is the provision of a screw-threaded opening in the piston head. It is also to be noted that no fine machining or adjustments are necessary in making and installing the member 12. The member can be readily made by a single stamping operation.

It is also pointed out that when my invention is used in a compensating compressor of the type disclosed, the passages 10 in the piston are permitted to be increased in diameter, thus facilitating the flow of fluid past the piston during its return stroke.

Although I have disclosed only one embodiment of my invention, it is to be understood that modifications may be made without departing from the fundamental principles of my invention and I, therefore, do not intend that the scope of my invention be limited except as set forth by the appended claims.

Having fully described my invention, what I claim as new and desire to secure by Letters Patent of the United States is:

1. In fluid pressure mechanism, a cylinder, a piston reciprocable therein and provided with a passage therethrough, a packing cup associated with the head of the piston, and a dished resilient member interposed between the head of the piston and the packing cup, said member overlying the open end of the piston passage but normally out of contact with the surface of the piston head adjacent the passage.

2. In fluid pressure mechanism, a cylinder, a piston reciprocable therein and provided with a passage therethrough, a packing cup associated with the head of the piston, and a thin resilient member interposed between the head of the piston and the packing cup and overlying the open end of the piston passage, said member being so initially formed that it is normally biased out of contact with the surface of the piston head adjacent the passage.

3. In fluid pressure mechanism, a cylinder, a piston reciprocable therein and provided with a plurality of passages therethrough, a packing cup associated with the head of the piston, and a member interposed between the piston head and the packing cup and provided with a plurality of resilient fingers, each of said fingers overlying the open end of a passage and so formed as to be normally biased out of contact with the surface of the piston head adjacent the passage.

4. In fluid pressure mechanism, a cylinder, a piston reciprocable therein and provided with a passage therethrough, a packing cup associated with the head of the piston, and a resilient member secured to the head of the piston and provided with a portion overlying the open end of the passage but normally biased out of contact with the surface of the piston head adjacent the passage for preventing the material of the cup from being forced into said passage when under pressure.

5. In a fluid pressure mechanism, a cylinder, a piston reciprocable therein and provided with a plurality of passages adjacent its periphery, a packing cup associated with the head of the piston, and a dished resilient member secured to the head of the cup and overlying the open ends of the passages to prevent the material of the cup from being forced into said passages, said member being normally biased out of contact with the surface of the piston head adjacent each passage.

6. In a fluid pressure mechanism, a cylinder, a piston reciprocable therein and provided with a plurality of passages adjacent its periphery, a packing cup associated with the head of the piston, a member secured to the head of the piston and provided with a plurality of radial fingers overlying the open ends of the passages whereby the material of the cup is prevented from being forced into said passages during the pressure stroke of the piston.

7. In combination with a piston having a passage therethrough and a flexible packing cup associated with the head of the piston, means for preventing the material of the cup from being forced into the passages when said piston is actuated to apply pressure to a fluid, said means comprising a resilient member secured to the piston and overlying the piston passage and being normally biased out of contact with the surface of the piston head adjacent the passage.

8. In combination with a piston having a plurality of spaced passages therethrough adjacent its periphery and a flexible packing cup associated with the head of the piston, of means interposed between the piston head and the cup for preventing the material of the cup from being forced into the passages when said piston is actuated to apply pressure to a fluid, said means comprising a thin dished member secured to the piston head and having a plurality of resilient radial fingers overlying the open ends of said passages.

BURNS DICK.